(12) United States Patent
Tipton et al.

(10) Patent No.: US 9,008,684 B2
(45) Date of Patent: Apr. 14, 2015

(54) SHARING TIMED FINGERPRINT LOCATION INFORMATION

(75) Inventors: Rick Tipton, Corryton, TN (US); Mark Austin, Roswell, GA (US); Sheldon Meredith, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/284,497

(22) Filed: Oct. 28, 2011

(65) Prior Publication Data

US 2013/0109407 A1 May 2, 2013

(51) Int. Cl.
*H04W 24/00* (2009.01)
*G01S 5/02* (2010.01)

(52) U.S. Cl.
CPC .................................. *G01S 5/0252* (2013.01)

(58) Field of Classification Search
CPC ..... H04W 28/04; H04W 16/14; H04W 24/00; H04L 1/001; H04L 1/664
USPC ..................................... 455/456.1
See application file for complete search history.

(56) References Cited

U.S. PATENT DOCUMENTS

| | | | |
|---|---|---|---|
| 4,718,081 A | 1/1988 | Brenig | |
| 5,515,062 A | 5/1996 | Maine et al. | |
| 5,724,660 A | 3/1998 | Kauser et al. | |
| 5,732,354 A | 3/1998 | MacDonald | |
| 5,732,383 A | 3/1998 | Foladare et al. | |
| 5,844,521 A | 12/1998 | Stephens et al. | |
| 5,982,324 A | 11/1999 | Watters et al. | |
| 6,018,312 A | 1/2000 | Haworth et al. | |
| 6,026,301 A | 2/2000 | Satarasinghe | |
| 6,108,532 A | 8/2000 | Matsuda et al. | |
| 6,108,556 A | 8/2000 | Ito | |
| 6,125,125 A | 9/2000 | Narasimha et al. | |
| 6,148,219 A | 11/2000 | Engelbrecht et al. | |
| 6,216,002 B1 | 4/2001 | Holmring | |
| 6,230,018 B1 | 5/2001 | Watters et al. | |
| 6,256,577 B1 | 7/2001 | Graunke | |

(Continued)

FOREIGN PATENT DOCUMENTS

| | | |
|---|---|---|
| EP | 0856746 A2 | 8/1998 |
| JP | 2004069609 | 3/2004 |

(Continued)

OTHER PUBLICATIONS

OA dated Apr. 13, 2012 for U.S. Appl. No. 12/416,853, 36 pages.

(Continued)

*Primary Examiner* — Mazda Sabouri
(74) *Attorney, Agent, or Firm* — Amin, Turocy & Watson, LLP

(57) ABSTRACT

The disclosed subject matter provides for sharing timed fingerprint location information. In an aspect, timed fingerprint location information can be associated with a location of a user equipment. This timed fingerprint location information can be shared with other devices. As such, with proper analysis, these other devices can employ the shared timed fingerprint location information to determine their location. In an aspect, the other devices can determine that they are located at the same location as the user equipment. However, a level of error can be inherent in the location determined from shared timed fingerprint location information. In some embodiments, this error can be compensated for.

21 Claims, 10 Drawing Sheets

(56) References Cited

U.S. PATENT DOCUMENTS

| | | |
|---|---|---|
| 6,263,190 B1 | 7/2001 | Mamori et al. |
| 6,298,233 B1 | 10/2001 | Souissi et al. |
| 6,307,503 B1 | 10/2001 | Liu |
| 6,311,078 B1 | 10/2001 | Hardouin et al. |
| 6,317,686 B1 | 11/2001 | Ran et al. |
| 6,330,459 B1 | 12/2001 | Chrichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,432,829 B2 | 10/2008 | Poltorak |
| 7,436,794 B2 | 10/2008 | Takahashi et al. |
| 7,508,321 B2 | 3/2009 | Gueziec et al. |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,121,604 B1 | 2/2012 | Schwinghammer |
| 8,140,079 B2 | 3/2012 | Olson et al. |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,307,030 B1 | 11/2012 | Hu |
| 8,355,364 B1 | 1/2013 | Vargantwar et al. |
| 8,355,865 B2 | 1/2013 | Wagner et al. |
| 8,417,264 B1 * | 4/2013 | Whitney et al. ............ 455/456.6 |
| 8,548,494 B2 | 10/2013 | Agarwal et al. |
| 8,594,700 B2 | 11/2013 | Nabbefeld |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0092448 A1 | 5/2003 | Forstrom et al. |
| 2003/0097330 A1 | 5/2003 | Hillmer et al. |
| 2003/0115260 A1 * | 6/2003 | Edge ............................ 709/203 |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 * | 7/2004 | Walsh ........................... 370/338 |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner |
| 2005/0276385 A1 | 12/2005 | McCormick et al. |
| 2006/0030333 A1 | 2/2006 | Ward et al. |
| 2006/0046744 A1 * | 3/2006 | Dublish et al. .............. 455/456.3 |
| 2006/0075131 A1 | 4/2006 | Douglas et al. |
| 2006/0089153 A1 | 4/2006 | Sheynblat |
| 2006/0240839 A1 | 10/2006 | Chen et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 * | 6/2008 | Park et al. ..................... 709/223 |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0131073 A1 | 5/2009 | Carlson et al. |
| 2009/0181695 A1 | 7/2009 | Wirola et al. |

(56) References Cited

U.S. PATENT DOCUMENTS

| | | |
|---|---|---|
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0310501 A1 | 12/2009 | Catovic et al. |
| 2009/0327134 A1 | 12/2009 | Carlson et al. |
| 2010/0020776 A1 | 1/2010 | Youssef et al. |
| 2010/0054237 A1 | 3/2010 | Han et al. |
| 2010/0058442 A1 | 3/2010 | Costa et al. |
| 2010/0081389 A1 | 4/2010 | Lawrow |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0189236 A1 | 7/2010 | MacDonald |
| 2010/0190509 A1 | 7/2010 | Davis et al. |
| 2010/0195566 A1 | 8/2010 | Krishnamurthy et al. |
| 2010/0203903 A1* | 8/2010 | Dingler et al. ............ 455/456.5 |
| 2010/0207470 A1* | 8/2010 | Kim et al. ................ 310/90 |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0299060 A1* | 11/2010 | Snavely et al. ............... 701/201 |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Bernheim Brush et al. |
| 2012/0182874 A1 | 7/2012 | Siomina et al. |
| 2012/0287911 A1 | 11/2012 | Takano et al. |
| 2012/0317500 A1 | 12/2012 | Kosseifi et al. |
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0171060 A1 | 6/2014 | Cook et al. |

FOREIGN PATENT DOCUMENTS

| | | |
|---|---|---|
| JP | 2007328050 A | 12/2007 |
| WO | 2006031035 A1 | 3/2006 |

OTHER PUBLICATIONS

Office Action dated Dec. 15, 2011 for U.S. Appl. No. 12/712,424, 34 pages.

Office Action dated Dec. 28, 2011 for U.S. Appl. No. 12/836,471, 34 pages.

Office Action dated Feb. 23, 2012 for U.S. Appl. No. 12/967,747, 31 pages.

International Search Report for PCT Application No. US2011/026122 dated Sep. 10, 2011, 11 pages.

International Search Report for PCT Application No. US2011/026120 dated Sep. 9, 2011 13 pages.

Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_en US398&q=cache:trsMn9Sin6wJ:http://apb.directionsmag.com/entry/location-labs-powers-location-based-fraud-detection/162802+http%3A//apb.directionsmag.com/entry/location-labs-powers-location-based- . . . 1&ct=clnk, Oct. 12, 2010, 5 pages.

"Location Based Fraud Detection", Finsphere Corporation, 2008-2010, 4 pages.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/sumunary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.

Drucker, et al. Support Vector Regression Machines. http://scholar.google.com/scholar?q=%22Support+Vector+Regression+Machines.%22. Last accessed Dec. 24, 2010, 7 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN luh interface Node B Application Part (NBAP) signalling (Release 8)", 3GPP TS 25.469 V8.0.0 (Dec. 2008).

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6).

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6).

(56) References Cited

OTHER PUBLICATIONS

Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages.
Koukoumidis Emmanouil, Peh Li-Shiuan, Martonosi Margaret, SignalGuru: Leveraging Mobile Phones for Collaborative Traffic Signal Schedule Advisory. 14 pages.
Bitcarrier Technology. Published online at http://www.bitcarrier.com/technology. 1 page.
Hao Peng, Ban Xuegang(Jeff). Estimating Vehicle Position in a Queue at Signalized Intersections Using Simple Travel Times from Mobile Sensors. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Final Office Action dated Jan. 25, 2013, for U.S. Appl. No. 13/554,285, 20 pages.
Non-Final Office Action dated Mar. 19, 2013, for U.S. Appl. No. 13/174,541, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Apr. 19, 2013, for U.S. Appl. No. 13/277,595, 58 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Aug. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Marko Silventoinen, et al., "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 18, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00(c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9th, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN Iu interface RANAP signalling.
Calabrese, et al., "Real-Time Urban Monitoring Using Cell Phones: A Case Study in Rome". IEEE Transactions on Intelligent Transpor-

(56) References Cited

OTHER PUBLICATIONS tation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/O.
Represent. (2011). In The american heritage dictionary of the english language. Retrieved on May 9, 2014 from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Final Office Action dated Apr. 3, 2014 for U.S. Appl. No. 13/188,295, 37 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance mailed Jan. 21, 2015 for U.S. Appl. No. 13/495,391, 98 pages.

\* cited by examiner

SHARING TIMED FINGERPRINT LOCATION INFORMATION

CROSS-REFERENCE TO RELATED APPLICATIONS

This application is related to U.S. patent application Ser. No. 12/712,424, filed Feb. 25, 2010, which is hereby incorporated by reference in its entirety. This application is also related to U.S. patent application Ser. No. 12/836,471, filed Jul. 14, 2010, which is also hereby incorporated by reference in its entirety.

TECHNICAL FIELD

The disclosed subject matter relates to transportation analytics and, more particularly, to employing mobile devices as data sources for transportation analytics.

BACKGROUND

Conventional sources of location information for mobile devices are based on a wide variety of location determination technologies, such as global positioning system (GPS) technology, triangulation, multilateration, etc. These sources of data have provided the opportunity to capture location information for a device and share it with another device, which can allow non-location enabled devices to participate, at some level, in location-centric services. In contrast to conventional systems that rely on technologies such as GPS, triangulation, multilateration, etc., the use of timed fingerprint location (TFL) technology can provide advantages over the conventional technologies. For example, GPS is well known to be energy intensive and to suffer from signal confusion in areas with interference between the satellite constellation and the GPS enabled device. Further, GPS is simply not available on many mobile devices, especially where the devices are cost sensitive. Multilateration and triangulation technologies are computationally intensive, which can result in processing time issues and a corresponding level of energy consumption.

The above-described deficiencies of conventional mobile device location data sources for transportation analytics is merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to sharing TFL information between user equipment. In one example embodiment, a system comprises a location component that receives timed fingerprint location information. The exemplary system further comprises an access component that determines a level of access to the TFL information. This level of access can be associated with a request for access to the TFL information. A TFL information interface component can facilitate access to the TFL information based on the determined level of access.

In another example embodiment, a system comprises an antenna component adapted for short-range communications. The system further comprises an information interface to facilitate communications related to sharing TFL information. A request to share TFL information can result in receiving shared TFL information. The received shared TFL information can be stored in a memory component of the exemplary system.

In a further embodiment, a method comprises receiving TFL information for a UE. The example method further comprises receiving a request to share the TFL information. Access to the TFL information can be allowed in response to the request to share the TFL information.

In another example embodiment, a method comprises generating a request to share TFL information. The request can result in a receiving a portion of the TFL information.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
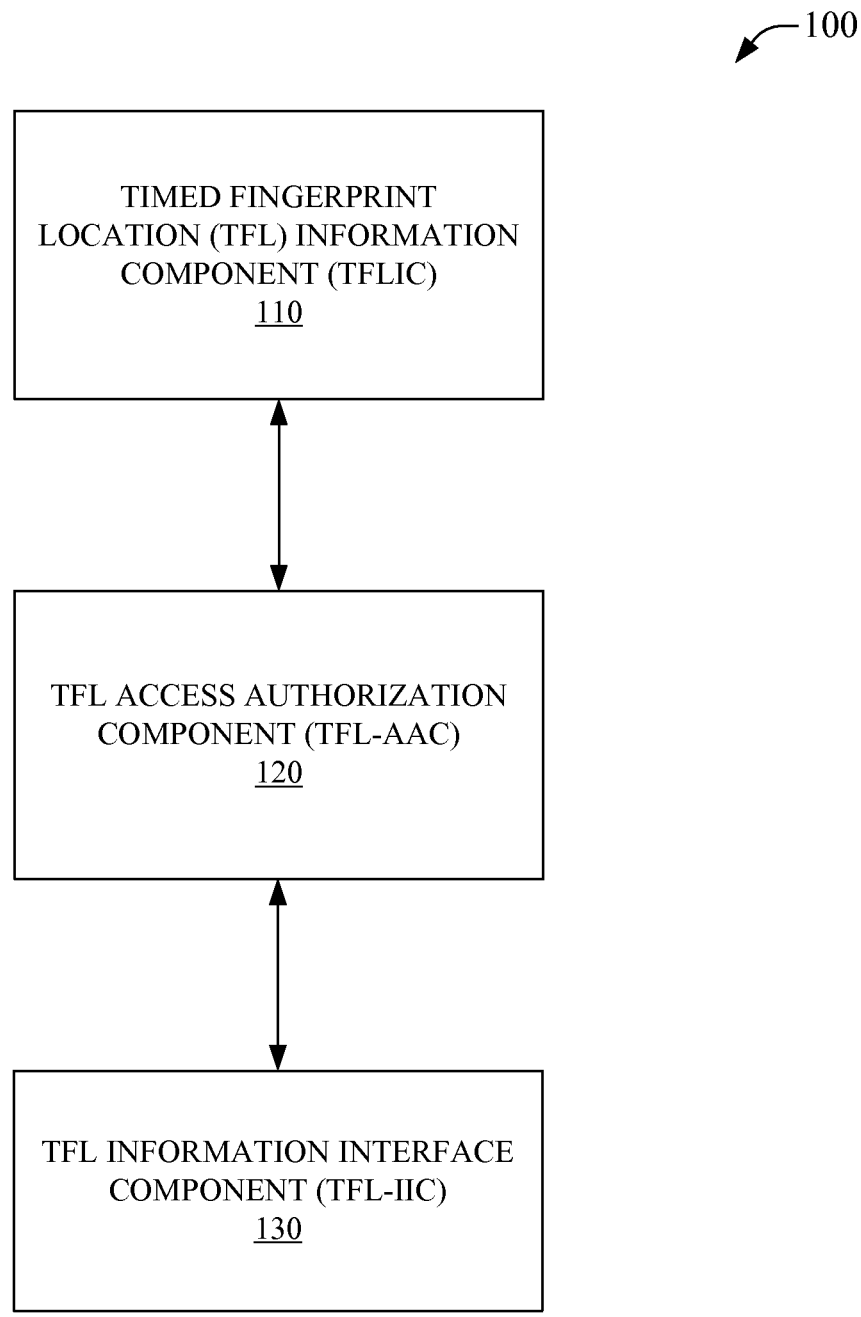
FIG. 1 is an illustration of a system that facilitates sharing TFL information in accordance with aspects of the subject disclosure.

The presently disclosed subject matter illustrates sharing timed fingerprint location (TFL) information. Sharing can allow devices to employ TFL information from a TFL source device. As an example, a laptop without a GPS receiver can receive shared TFL information from a TFL-enabled cell phone, i.e., the TFL-enabled cell phone can be the TFL source device. Based on the shared TFL information, the laptop can determine where it is located, with some accepted level of error. This determined location, based on TFL information from a TFL source device, can enable location-centric features for the laptop. These location-centric features might not otherwise have been enabled. As a second example, a GPS enabled tablet computer can be located in a building and therefore have poor reception of GPS signals thereby limiting the ability of the tablet computer to determine its location. Shared TFL information can facilitate the laptop determining its location.

TFL information can include location information or timing information as disclosed in more detail in U.S. Ser. No. 12/712,424 filed Feb. 25, 2010, which application is hereby incorporated by reference in its entirety. Further, such information can be accessed from active state or idle state user equipment as disclosed in more detail in U.S. Ser. No. 12/836,471, filed Jul. 14, 2010, which application is also hereby incorporated by reference in its entirety. As such, TFL information component can facilitate access to location information or timing information for a mobile device or user equipment (UE) in an active or idle state. TFL information can be information from systems in a timed fingerprint location wireless environment, such as a TFL component of a wireless telecommunications carrier. As a non-limiting example, UEs, including mobile devices not equipped with a GPS-type system, can be associated with TFL information, which can facilitate determining a location for a UE based on the timing information associated with the UE.

In an aspect, TFL information can include information to determine a differential value for a NodeB site pair and a bin grid frame, as disclosed in more detail in incorporated U.S. Ser. No. 12/712,424. A centroid region (possible locations between any site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the lookup. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

Moreover, whereas TFL can be operable in a wide array of current and legacy devices without any substantial dependence on GPS technologies, a greater number of mobile devices can act as TFL source devices than would be expected for GPS-enabled devices at the current time. A greater number of data sources is generally considered desirable in facilitating access to location information. Further, where TFL information can be employed in a lookup of location data sets, TFL can be much less computationally intense than triangulation or multilateration technologies. Reduced computational load is generally desirable in UE devices. TFL can piggyback on timing signals employed in wireless telecommunications, which systems are already deployed. A reduced need to rollout of additional hardware is generally considered desirable. Additionally, by piggybacking on existing timing signals and by reducing the computational load, TFL can be associated with minimal additional energy expenditure in sharp contrast to GPS or triangulation/multilateration technologies. Reduced energy expenditure is generally related to reduced battery drain in mobile devices and is typically a highly desirable trait.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates sharing TFL information in accordance with aspects of the subject disclosure. System 100 can include timed fingerprint location information component (TFLIC) 110. TFLIC 110 can facilitate access to TFL information. TFL information can be location information derived from TFL timing information or TFL timing information that can facilitate determining a location. TFL timing information can be for one or more NBSPs. TFL information can be derived from timing associated with one or more NBSPs.

TFLIC 110 can be communicatively coupled with timed fingerprint location access authorization component (TFL-AAC) 120, hereinafter TFL-AAC or AAC. AAC 120 can determine a level of TFL information access based on a request for access to TFL information. A request for access to TFL information can be received by a TFL source device. The request for access to TFL information can be generated by a device seeking to access TFL information from a TFL source device. As an example, a GPS-enabled cellphone can generate a request to access TFL information from a TFL-enabled cellphone. The TFL-enabled cell phone can receive the request for access to TFL information. AAC 120, in this example, can determine that access to the TFL information of the TFL-enabled cell phone can be accessed by the GPS-enabled cell phone.

In an aspect, different levels of TFL information access can be associated with accessing different sets of TFL information, different amounts of TFL information, different types of TFL information, etc. As an example, a limited access to TFL information can be associated with accessing only a single TFL timing measurement in contrast to an unlimited access to TFL information that can be associated with accessing many TFL timing measurements. As a second example, a limited access to TFL information can be associated with accessing TFL timing measurement in contrast to an unlimited access to TFL information that can be associated with accessing location information derived from TFL measurements. As a third example, a limited access to TFL information can be associated with accessing instant TFL timing measurements in contrast to an unlimited access to TFL information that can be associated with accessing historical TFL timing measurements. It is to be noted that any other form of limiting access to TFL information falls within the scope of the present disclosure even where not explicitly recited herein for brevity and clarity.

AAC 120 can be communicatively coupled with timed fingerprint location information interface component (TFL-IIC) 130, hereinafter TFL-IIC or IIC. IIC 130 can facilitate interaction between a TFL source device and other devices. In an embodiment, IIC 130 can facilitate receiving a request for access to TFL information. As an example, IIC 130 can receive a request for TFL information at a TFL enabled cellphone from an automobile navigation system. In another embodiment, IIC 130 can provide information about a TFL source device to other devices. As an example, IIC 130 can generate a beacon indicating that a TFL source device is accepting requests for TFL information. This exemplary beacon can allow listening devices to begin requesting TFL information from the associated TFL source device by way of system 100.

In an aspect, once the request for TFL information has been processed and a level of access determined, the TFL information can be accordingly accessed. The accessed TFL information can be employed to determine a location. This determined location will inherently have some level of error. The error can be associated with the error present in the TFL information itself, error associated with computation of a location form TFL information, or error associated with presuming the determined location is similar or the same as that derived from the accessed TFL information. As an example of the later error, determining a location for TFL information from a TFL source device can simply be presuming the location of the requesting device and the TFL source device are the same. Continuing the example, where the requesting device and the TFL source device are indeed collocated, such as where a user's laptop requests TFL information from a TFL-enabled cellphone of the user, the error associated with the determined location can be minimal. In contrast, where the requesting device and the TFL source device are not collocated or are only temporarily collocated, such as where a first cell phone on a subway car requests TFL information from a TFL source device on the subway platform as the subway car is departing, can be associated with much larger errors in accuracy of a location presumed to be the same for both the requesting device and the TFL source device.

Numerous correction techniques can be applied to correct for inherent error in the location determined from the accessed TFL information. These particular techniques are beyond the scope of the subject disclosure although the use of any such correction technique falls within the present disclosure. As an example, where a requesting device is moving away from a TFL source device, this change in relative position can be determined and employed to compute a level of error or correction factor. As a second example, where a requesting device and TFL source device employ a communication technology associated with a communication range, such as using Bluetooth with a range of about 10 meters, this communication technology characteristic can be employed in determining a level of error or correction factor.

In an embodiment, user actions can be associated with interactions relative to accessing TFL information for a TFL source device. These user actions can be predetermined settings, automated settings, or can require user intervention. As an example, a device can be set to automatically seek sharing of TFL information. As a second example, a device can be set to share TFL information with predetermined sets of devices, such as sharing TFL information among all devices belonging to a single user. As a third example, a device can require specific input to shared TFL information, such as "bumping" a requesting device and TFL source device by emulating a fist-bump action between the two device.

Figure 2:
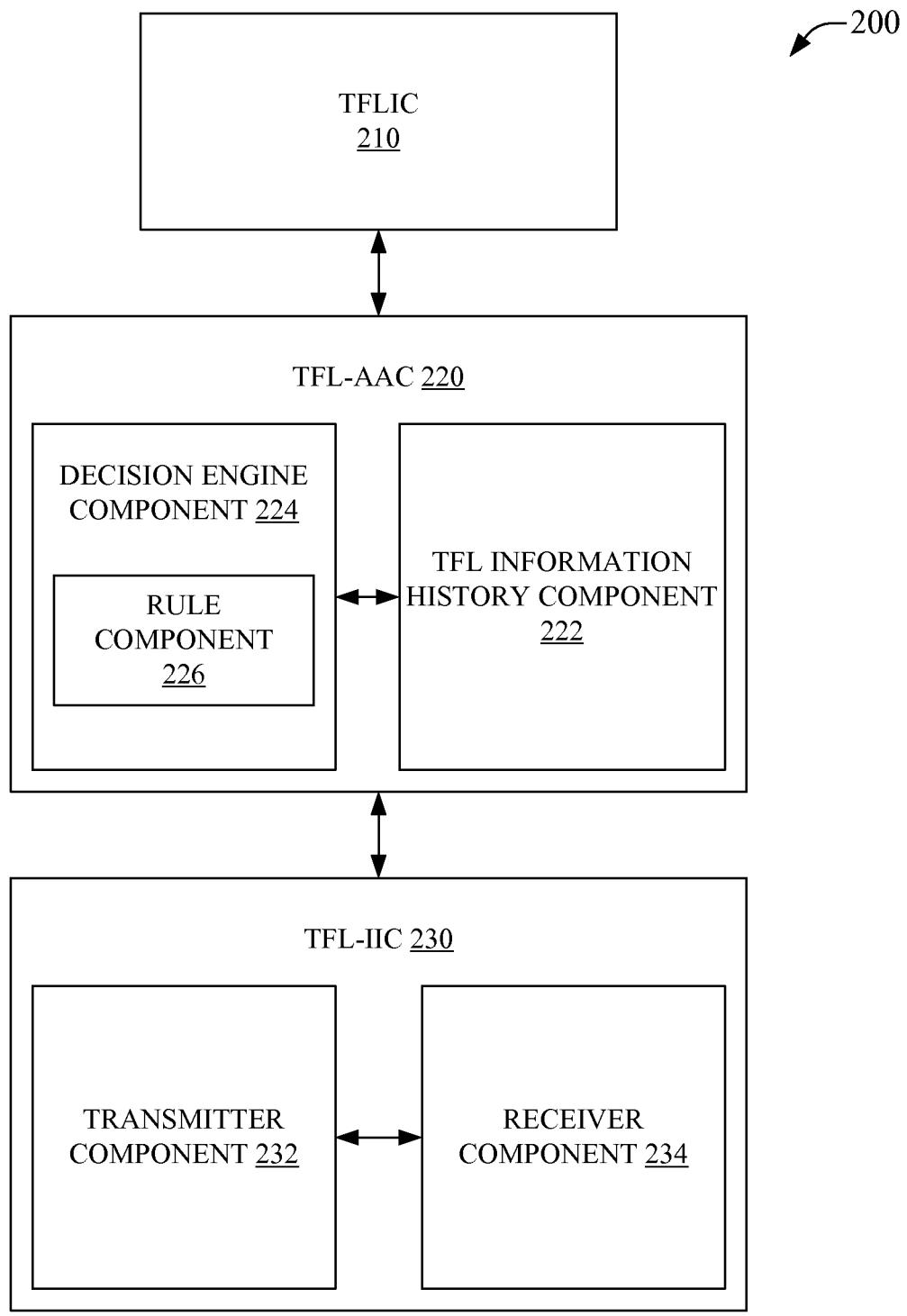
FIG. 2 is a depiction of a system that facilitates sharing TFL information in accordance with aspects of the subject disclosure.

FIG. 2 is a depiction of a system 200, which can facilitate sharing TFL information in accordance with aspects of the subject disclosure. System 200 can include TFLIC component 210. TFLIC 210 can facilitate access to TFL information. TFLIC 210 can be communicatively coupled to TFL-AAC 220. AAC 220 can determine a level of TFL information access based on a request for access to TFL information. AAC 220 can be communicatively coupled to TFL-IIC. IIC 130 can facilitate interaction between a TFL source device and other devices.

AAC 220 can include TFL information history component 222. TFL information history component 222 can facilitate access to historic TFL information. In certain circumstances, access to historic TFL information can be shared by way of system 200. Historic TFL information, accessed by way of TFL information history component 222, can include historic timing information, historic location information, etc. One example includes accessing the TFL information of a TFL source device for the last 60 minutes, which can be shared, in a limited or unlimited manner, to allow another device to employ the shared TFL information, such as to determine, with a level of inherent error, the location of the other device over the last 60 minutes.

AAC 220 can further include decision engine component 224 that can facilitate forming determinations relating to a sharing rule. Determinations can include satisfying a sharing rule, not satisfying a sharing rule, satisfying part of a sharing rule, applying a sharing rule to a set of information, etc. A determination relating to a sharing rule can be related to TFL information or a level of access to TFL information. As a first example, where a sharing rule is satisfied when a UE owner is the same as a TFL source device owner, decision engine component 224 can determine that this rule is satisfied by comparing owner information of the TFL source device and the UE. As a further example, decision engine component 224 can apply a weighting rule to TFL information and historical TFL information, such as where a rule indicates that a weighting factor relating to accessing historical TFL information of 10× is to be applied to historical TFL information over one hour old, e.g., making access to historical information less accessible. Numerous other examples of specific sharing rules are not explicitly recited for brevity but are to be considered within the scope of the present disclosure.

In an aspect, decision engine component 224 can include rule component 226 to facilitate forming determinations related to a sharing rule. Rule component 226 can facilitate employing one or more sharing rules. These rules can include rules for determining values pertinent to sharing TFL information. As one example, determining a value for a user input, e.g., determining "bumping", can be associated with granting a higher level of TFL information access authorization. In an embodiment, rule component 226 can be a rule engine that allows the application of logical determinations to be embodied in one or more algorithms related to sharing TFL information. As a non-limiting example, rule component 226 can generate a rule that allows unlimited access to TFL information among an enumerated set of UEs based on International Mobile Equipment Identity (IMEI) number, Media Access Control address (MAC address), etc.

IIC 230 can include a transmitter component 232 and a receiver component 234. Transmitter component 232 and receiver component 234 can facilitate sharing TFL information over a wireless interface. In an embodiment transmitter component 232 and receiver component 234 can be an antenna and associated electronics for wireless communications, such as those enumerated elsewhere herein. In another embodiment, transmitter component 232 and receiver component 234 can facilitate determining aspects of an employed wireless communications technology, such as determining a typical effective range for sharing TFL information over a Bluetooth link. The determined effective range can then be employed in determining a level of error associated with a location determination based on the shared TFL information.

Figure 3:
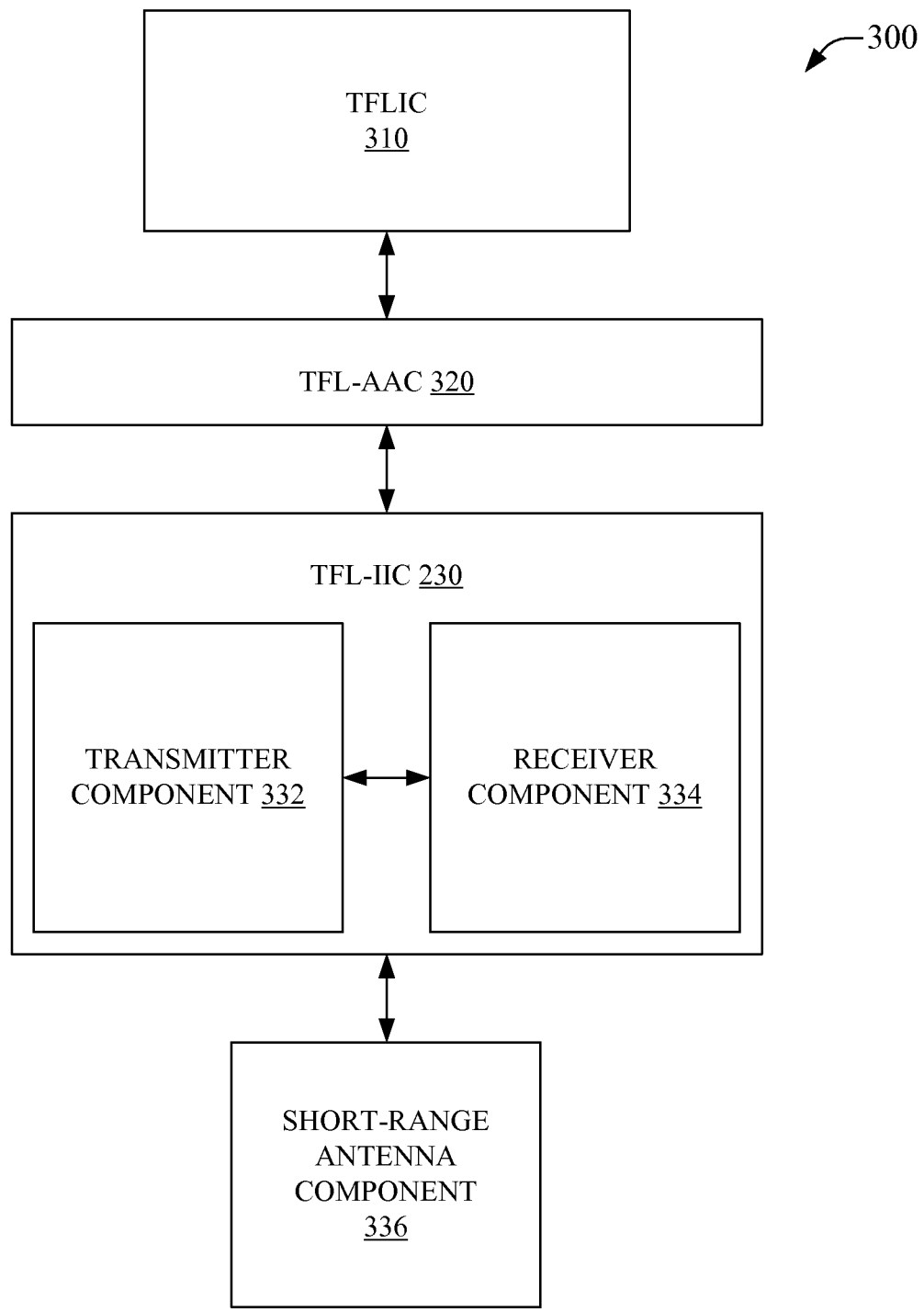
FIG. 3 illustrates a system that facilitates sharing TFL information in accordance with aspects of the subject disclosure.

FIG. 3 illustrates a system 300, which facilitates sharing TFL information in accordance with aspects of the subject disclosure. In one embodiment, system 300 can be embodied in a UE that can share TFL information with other devices requesting sharing, e.g., a TFL source device. System 300 can include TFLIC component 310. TFLIC 310 can facilitate access to TFL information. TFLIC 310 can be communicatively coupled to TFL-AAC 320. AAC 320 can determine a level of TFL information access based on a request for access to TFL information. AAC 320 can be communicatively coupled to TFL-IIC. IIC 130 can facilitate interaction between a TFL source device and other devices.

IIC 330 can include a transmitter component 332 and a receiver component 334. Transmitter component 332 and receiver component 334 can facilitate sharing TFL information over a wireless interface. In an embodiment transmitter component 332 and receiver component 334 can be electronics or software for wireless communications, such as those enumerated elsewhere herein. In another embodiment, transmitter component 332 and receiver component 334 can facilitate determining aspects of an employed wireless communications technology. In an aspect, transmitter component 332 and receiver component 334 can be associated with receiving a request to share TFL information and facilitating access to shared TFL information.

IIC 330 can be communicatively coupled to short-range antenna component 336. Short-range antenna component 336 can facilitate communicating between UEs to facilitate sharing TFL information. In some embodiments, short-range antenna component 336 can be associated with predetermined transmission regions. These transmission regions can be, for example, associated with a personal area network. A personal area network can be limited to devices on or near a user and can, for example, be associated with a range of about two meters. The exemplary short-range antenna component 336 coving about two meters would facilitate sharing TFL information from a TFL source device to other devices within about two meters of the TFL source device. This can be an efficient way of sharing TFL information among location enabled and non-location enabled devices of a single person, such as sharing a location sourced from a TFL-enabled cell phone to a laptop, watch, PDA, running shoe fob, etc., of a user to enable location-centric behavior on those devices. Other ranges can be employed and are within the scope of the present disclosure despite not being explicitly recited.

Figure 4:
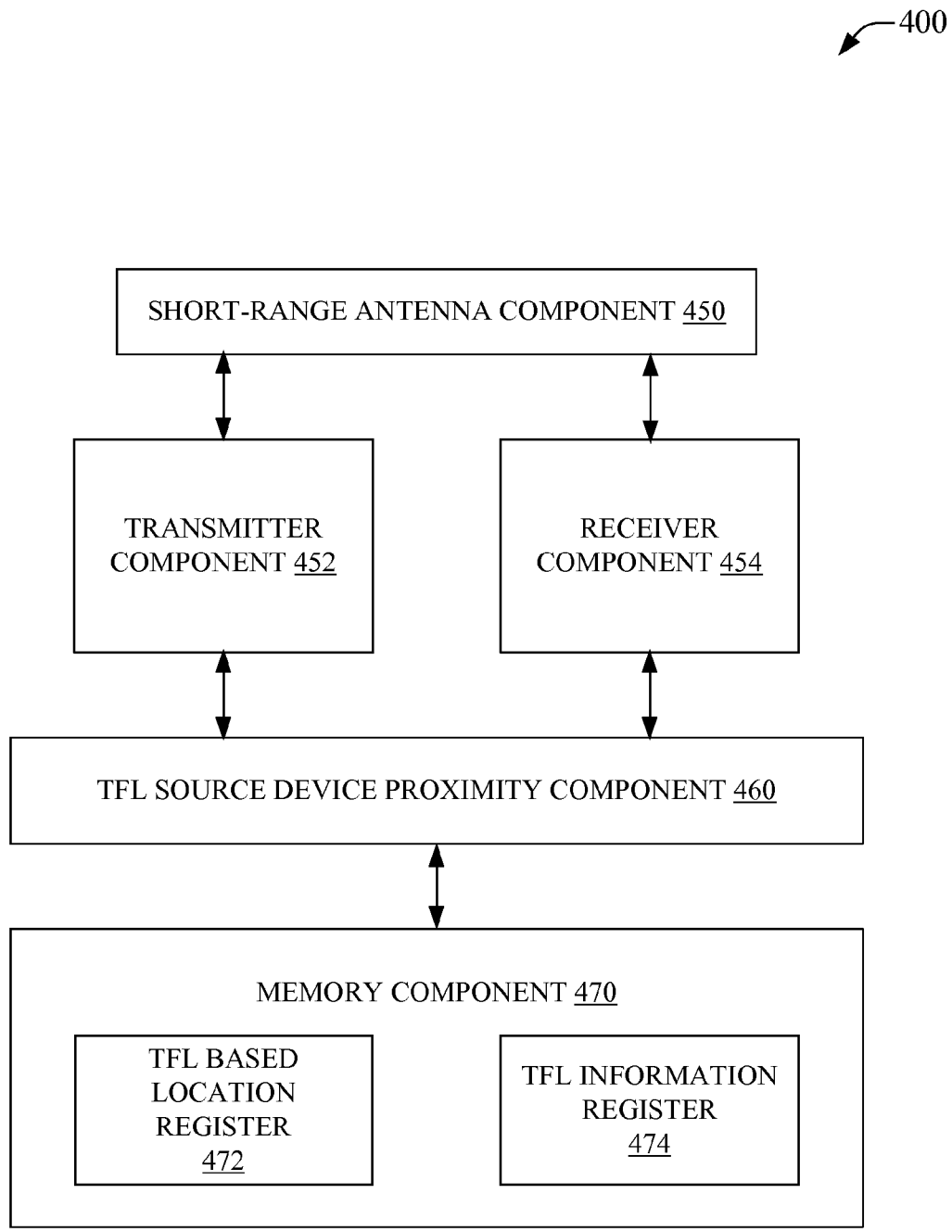
FIG. 4 is a depiction of a system that facilitates receiving shared TFL information in accordance with aspects of the subject disclosure.

FIG. 4 is a depiction of a system 400, which facilitates receiving shared TFL information in in accordance with aspects of the subject disclosure. In one embodiment, system 400 can be embodied in a UE that can request TFL information from a TFL source device. System 400 can include short-range antenna component 450. Short-range antenna component 450 can facilitate communication between various UEs to facilitate sharing TFL information. In some embodiments, short-range antenna component 450 can be associated with predetermined transmission regions that can include, for example, a personal area network. In an embodiment, short-range antenna component 450 can be the same as, or similar to, short-range antenna component 336 of system 300.

Short-range antenna component 450 can be communicatively coupled to transmitter component 452 and receiver component 454. Transmitter component 452 and receiver component 454 can facilitate sharing TFL information over a wireless interface. In an embodiment transmitter component 452 and receiver component 452 can be electronics or software for wireless communications, such as those enumerated elsewhere herein. In another embodiment, transmitter component 452 and receiver component 454 can facilitate determining aspects of an employed wireless communications technology. In some embodiments, transmitter component 452 and receiver component 454 can be the same as, or similar to transmitter component 332 and receiver component 334 of system 300. In an aspect, transmitter component 452 and receiver component 454 can be associated with facilitating access to a request to share TFL information and accessing shared TFL information.

Transmitter component 452 and receiver component 454 can be communicatively coupled to TFL source device proximity component 460. TFL source device proximity component 460 can facilitate determining the proximity of a TFL source device to a component of system 400. In an embodiment, TFL source device proximity component 460 can determine the proximity of a TFL source device based on a communication technology employed in communications with a TFL source device. As an example, TFL source device proximity component 460 can determine that a TFL source device is within about 10 meters of a component of system 400 when Bluetooth technology is associated with communications to the TFL source device.

TFL source device proximity component 460 can be communicatively coupled to memory component 470. Memory component 470 can be a data store. Memory component 470 can be employed to store data related to sharing TFL information. Memory component 470 can comprise TFL based location register 472 that can store a location derived from TFL information. Memory component 470 can further comprise TFL information register 474 that can store TFL timing information that can be employed to determine a location.

Figure 5:
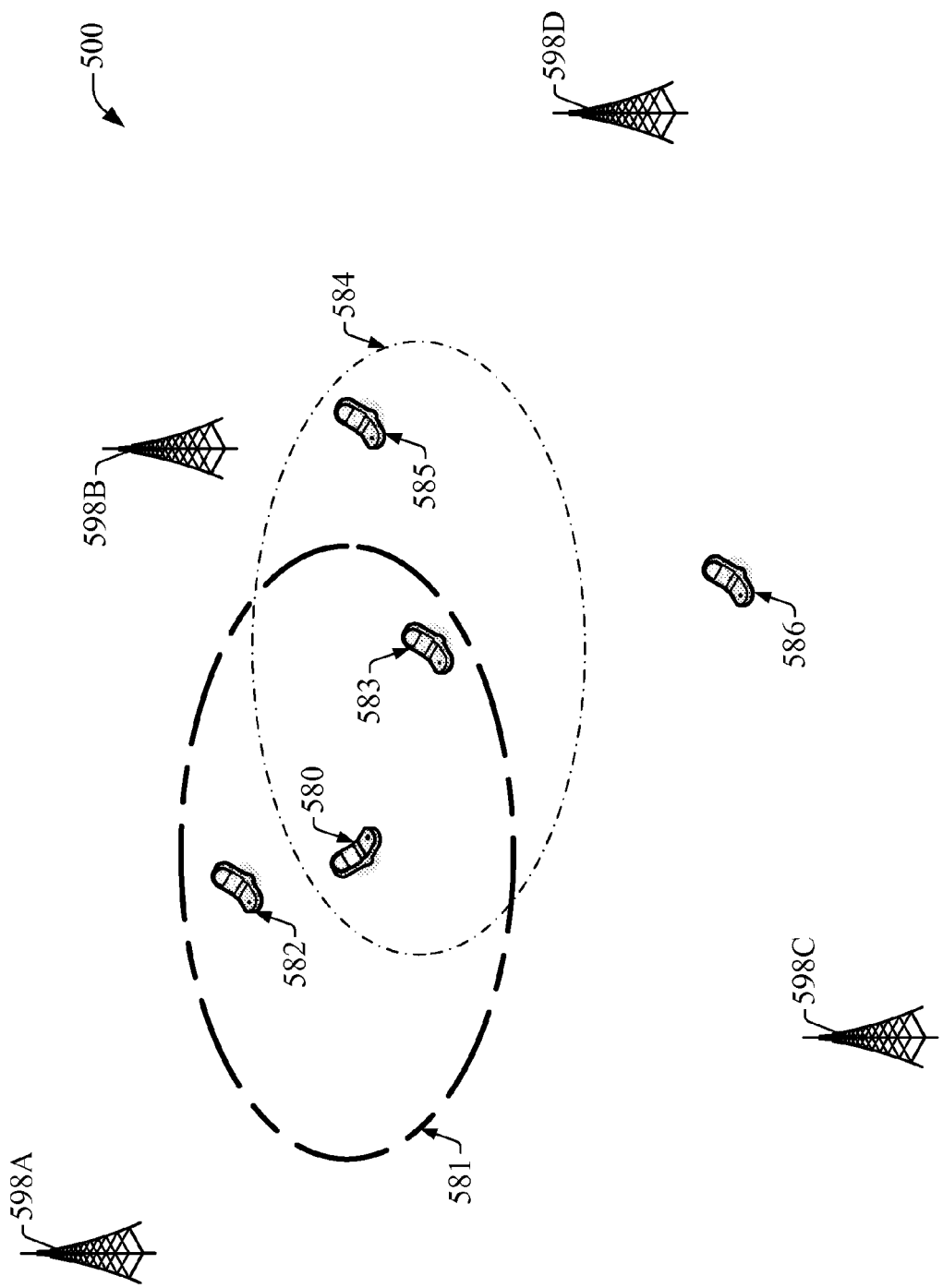
FIG. 5 illustrates an exemplary system including shared TFL information in accordance with aspects of the subject disclosure.

FIG. 5 illustrates an exemplary system 500 including shared TFL information in accordance with aspects of the subject disclosure. System 500 can include NodeBs 598A-D. Combinations of NodeBs 598A-D can act as NBSPs for determining TFL information. UE 580 can be a TFL-enabled UE. UE 580 can acquire TFL timing or location information relative to NodeBs 598A-D. UE 580 can be associated with a short-range communication region 581. UE 580 can be a TFL source device.

UEs 582 and 583 can be other UEs within the short-range communication region 581 of UE 580. Each of UE 582 can comprise a system that is the same as, or similar to, system 400 as disclosed herein. As such, each of UE 582 and UE 583 can generate a request to share TFL information. UE 580 can comprise a system that can be the same as, or similar to, system 300. As such, UE 580 can receive a request to share TFL information. UE 580 can further determine a level of access authorization for TFL information and can facilitate access to TFL information in accordance with the determined level of access authorization. UE 582 and UE 583 can receive TFL information shared from UE 580.

In an embodiment, the range of short-range communication region 581 can be determined. Based on this determination, locations determined on the shared TFL information at UE 582 and UE 583 can be associated with an error. In other embodiments, based on this error, a correction factor can be applied to the location determined from the shared TFL information where an error is associated with the determined location.

UE 583 can be associated with a short-range communication region 584. UE 585 can be within short-range communication region 584. As such, UE 583 can act as a TFL source device to share TFL information with UE 585. In an embodiment, this type of iterative sharing of TFL information can be limited by access authorization determination factors. In other embodiments, iterative-type sharing of TFL information can be identified with additional levels of error in subsequent location determinations based on the associated iterative level of TFL sharing. In further embodiments, iterative-type TFL sharing can be prohibited. UE 586 can be outside short-range communication region 581 and short-range communication region 584. In some embodiments, UE 586 can be considered outside of range for sharing TFL information.

As an example, UE 580 can be a modern TFL-enabled cell phone. Each of UEs 582, 583, 585 and 586 can be legacy cell phones that are not capable of directly determining their locations by way of conventional technologies such as GPS, triangulation, multilateration, etc. As such, where it is desirable to enable location-centric functionality in UEs 582, 583, 585 and 586, sharing TFL information with UE 580 can also be desirable. As illustrated in exemplary system 600, UE 582 and 583 can be within range, e.g., short-range communication region 581, of 580 and can request and receive shared TFL information from TFL source device UE 580. UE 585 can request a secondary share of TFL information from UE 580 by way of UE 583 where UE 585 is within range of UE 583, e.g., short-range communication region 584, and UE 583 is within range of UE 580, e.g., short-range communication region 581. UE 586 can be beyond a short-range communication region and can thus be unable to successfully communication a request to share TFL information with the other UEs of system 600.

This example illustrates that TFL information can be shared among devices. This TFL information can be employed in location-centric functions on UEs 582, 583 and 585. Levels of error inherent in the locations of UEs 582, 583 and 585 determined from the shared TFL information can be assessed, such as by estimating the area of short range communication region 581 and/or short range communication region 584. Further, these determined errors can be compensated for. Of note, where short range communication region 581, and also short range communication region 584, are relatively small in view of a bin-grid framework granularity associated with TFL information, the error can have little to no effect on the determined location. As an example, where the bin grid array granularity is 10 meters, a short-range communication region that has a radius of five meters would likely have an error that is less than the level of granularity and, as such, a determined location would likely be within one bin grid of the location of the TFL source device. Similarly, where the short-range communication region 581, for example, is about two meters, such as for a personal area network, the determined error can be much less than the level of granularity and the shared TFL information can be presumed to allow computation of locations that do not need to be corrected. Thus, where a user's devices share TFL information to allow location-centric functionality for devices that request sharing of TFL information, the resulting location determinations can effectively be treated as correct locations.

FIG. 5 is presented only to better illustrate some of the benefits of the presently disclosed subject matter and is explicitly not intended to limit the scope of the disclosure to the various aspects particular to the presently illustrated non-limiting example. In some embodiments, the use of GPS or other location technology can be included as complimentary to TFL information without departing from the scope of the present disclosure. It is noteworthy that GPS or other location information from a UE is not required to determine TFL information as disclosed in the related application. Thus, even where legacy UEs, e.g., UEs without GPS or eGPS capabilities, are represented in system 500, the timing information from those legacy devices can be employed in TFL information determinations. This can be particularly useful in regions that have limited distribution of GPS enabled UEs or where GPS functions poorly due to environmental factors such as urban cores, mountainous regions, etc.

Figure 6:
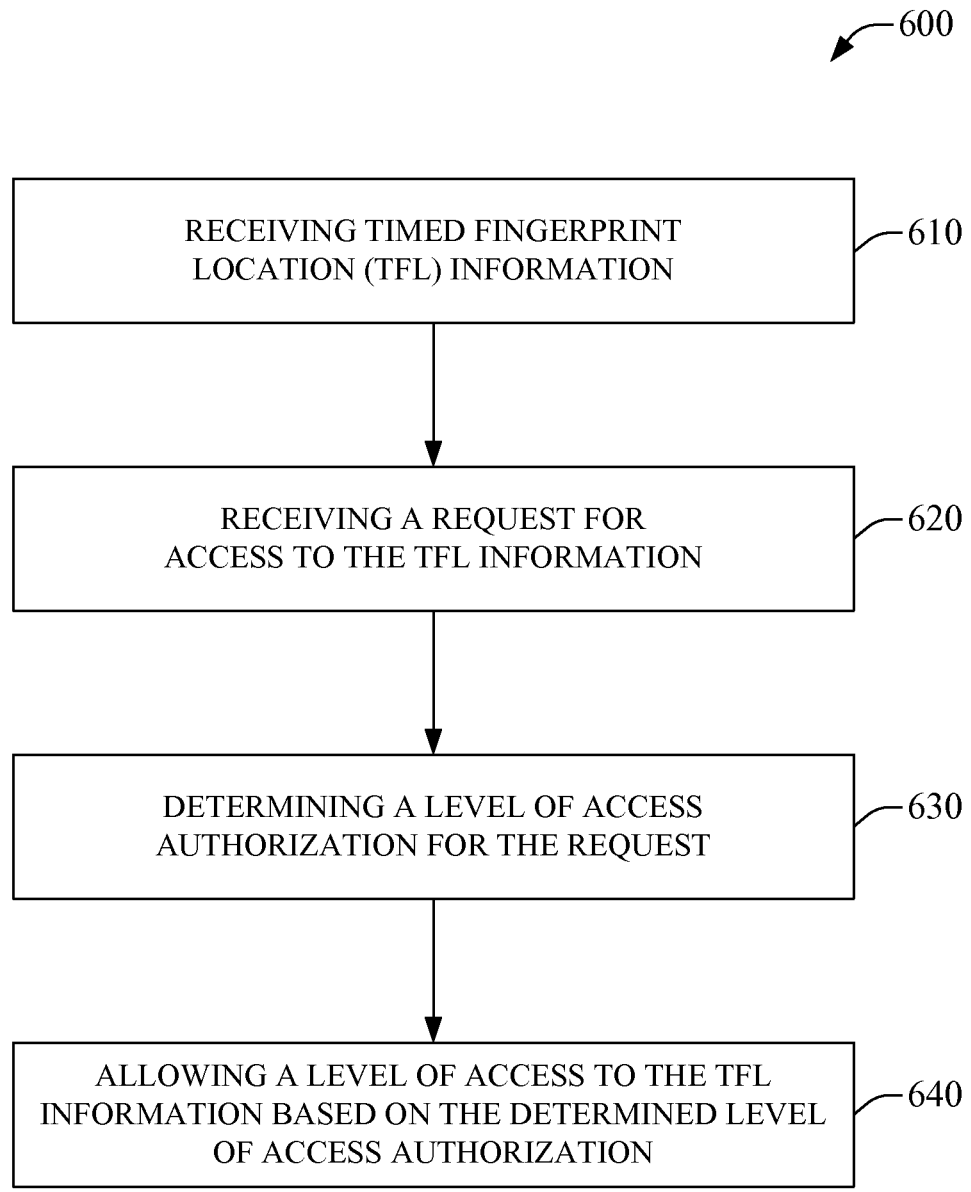
FIG. 6 illustrates a method facilitating sharing TFL information in accordance with aspects of the subject disclosure.
Figure 7:
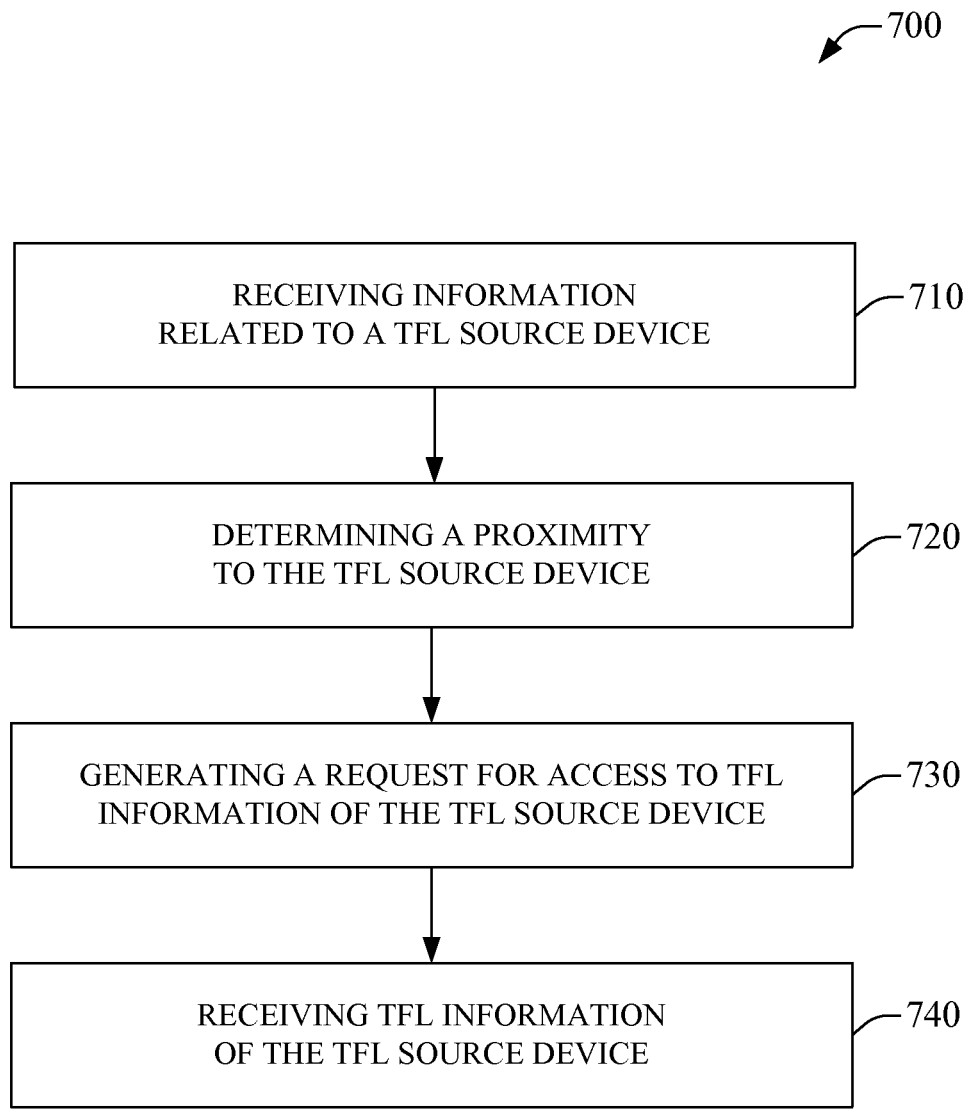
FIG. 7 illustrates a method for requesting sharing of TFL information in accordance with aspects of the subject disclosure.
Figure 8:
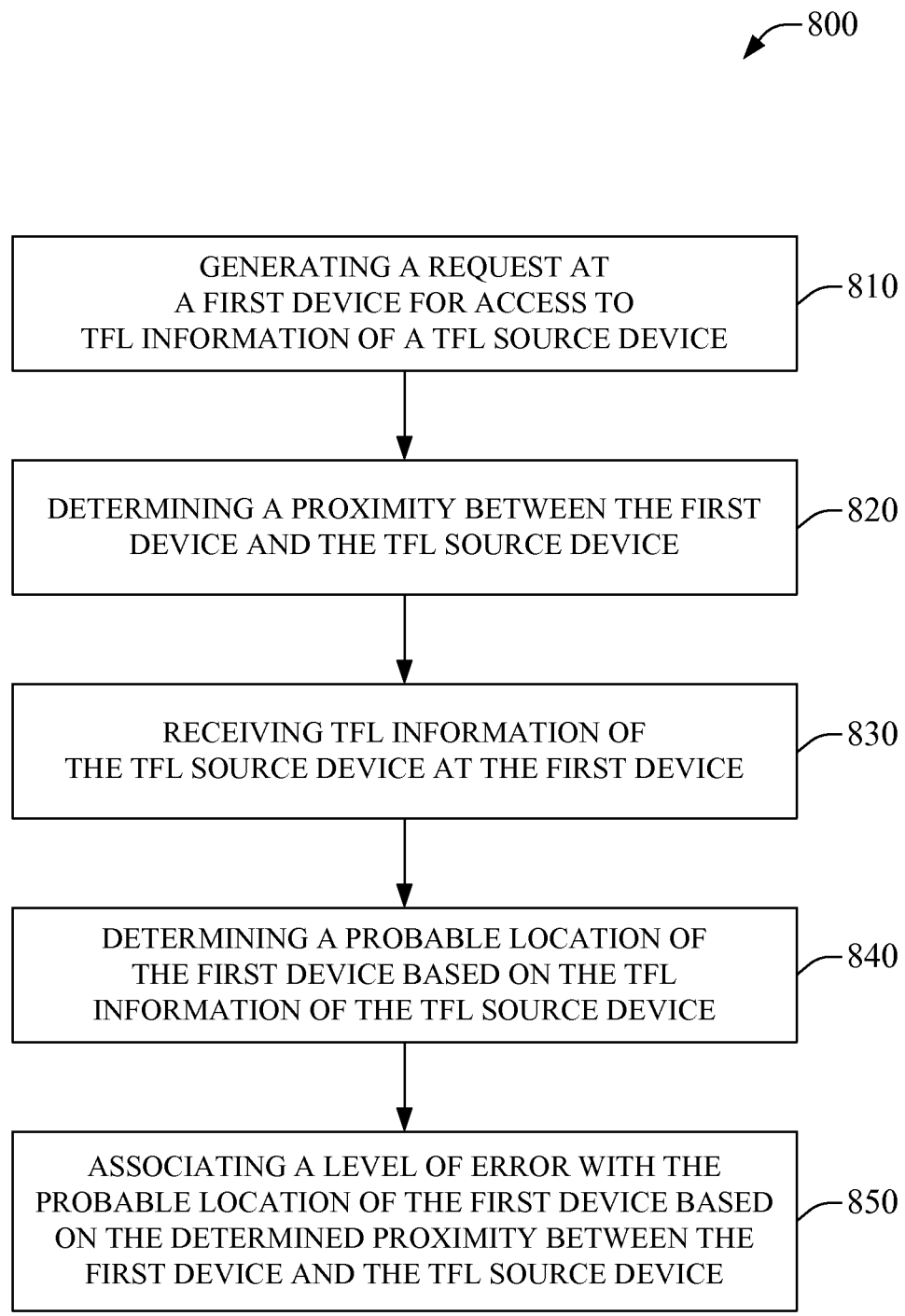
FIG. 8 illustrates a method facilitating receiving shared TFL information in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating sharing TFL information in accordance with aspects of the subject disclosure. At 610, TFL information can be received. TFL information can be location information derived from TFL timing information or TFL timing information that can facilitate determining a location. TFL information can include information to determine a differential value for a NodeB site pair and a bin grid frame, as disclosed in more detail in incorporated U.S. Ser. No. 12/712,424.

TFL information can include location information or timing information as disclosed in more detail in U.S. Ser. No. 12/712,424 filed Feb. 25, 2010, which application is hereby incorporated by reference in its entirety. Further, such information can be received from active state or idle state user equipment as disclosed in more detail in U.S. Ser. No. 12/836,471, filed Jul. 14, 2010, which application is also hereby incorporated by reference in its entirety. As such, TFL information can include location information for a UE, in an active or idle state, based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?,X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to further narrow the possible locations of the UE. Employing TFL information for location determination is demonstrably different from conventional location determination techniques or systems such as GPS, eGPS, triangulation or multilateration in wireless carrier environments, near field techniques, or proximity sensors.

At 620, a request for access to the TFL information can be received. In an embodiment, the request can be generated at devices seeking TFL information from TFL source devices. Receiving the request can include receiving information relating to the requesting system. Examples of information relating to the requesting system can include device identifiers, user identifiers or names, wireless carrier provider information, range information, communications technology information, intended use of shared TFL information, etc. In some embodiments, receiving a request for access to the TFL information at 620 can be based on user actions, such as "bumping". In other embodiments, receiving the request can be automatically processed or processed based on a predetermined set of criteria being satisfied.

At 630, a level of access authorization can be determined. Determining the level of access authorization can be based on the request for information received at 620. In an aspect, this can include basing the determination on information relating to the requesting system. As an example, a level of access authorization can be determined based on user identification for a UE requesting access to shared TFL information from a TFL source device. Determinations can include satisfying a sharing rule, not satisfying a sharing rule, satisfying part of a sharing rule, applying a sharing rule to a set of information, etc. A determination relating to a sharing rule can be related to TFL information or a level of access to TFL information. At 640, a level of access to the TFL information can be allowed based on the determine level of access authorization from 630. At this point, method 600 can end.

FIG. 7 illustrates aspects of a method 700 requesting sharing of TFL information in accordance with aspects of the subject disclosure. At 710, information related to a TFL source device can be received. A TFL source device can be a UE that can share TFL information. In an embodiment, a TFL source device can make available information identifying it as a TFL source device. In other embodiments, additional information can be included in the information made available and identifying a device as a TFL source device. This information can be received, for example, in a different device employing system 700. This information can be employed in making a determination to request sharing of TFL information with the TFL source device. As an example, where a first TFL source device identifies as belonging to Mozart, a second device, also belonging to Mozart, can determine that a request for sharing TFL information is appropriate because the TFL source device belongs to the same person, namely Mozart. Alternatively, where the second device belongs to Beethoven, a determination that a request should not be generated can be made because, for example, the two devices belong to different people.

At 720, a proximity to the TFL source device can be determined. The proximity can be employed in determining an amount of error that can be inherent in shared TFL information. Where a level of error crosses a threshold level, a determination can be made not to generate a request for sharing TFL information because the value of any shared TFL information in determining a location of a device requesting the shared TFL information in below an acceptable level due to the inherent error. As an example, where a range is greater than 100 meters, and an error may therefore greatly exceed a location with a bin grid array pitch of 20 meters, it can be determined that sharing TFL information is not sufficiently accurate enough to justify the sharing of the TFL information. However, where a proximity is close, such as for a personal area network, the error is likely to be small and a request for TFL information can be desirable.

At 730, a request for access to TFL information of the TFL source device can be generated. The request can include information about the requesting device. This information can include device identifiers, user identifiers or names, wireless carrier provider information, range information, communications technology information, intended use of shared TFL information, etc. In an embodiment, a TFL source device receiving a request, such as that generated at 730, can process the request to determine a level of access authorization. Based on this level, access to the TFL information of the TFL source device can be correspondingly adapted. At 740, TFL information of the TFL source device can be received. At this point, method 700 can end.

FIG. 8 illustrates a method 800 that facilitates receiving shared TFL information in accordance with aspects of the subject disclosure. At 810, a request at a first device for access to TFL information of a TFL source can be generated. The request can include information about the requesting device. This information can include device identifiers, user identifiers or names, wireless carrier provider information, range information, communications technology information, intended use of shared TFL information, etc. At 820, a proximity to the TFL source device can be determined. The proximity can be employed in determining an amount of error that can be inherent in shared TFL information. At 830, TFL information of the TFL source device can be received at the first device.

At 840, a probable location of the first device can be determined based on the TFL information of the TFL source device. In an embodiment, TFL calculations can be made on the shared TFL information. Whereas the TFL information can be shared between the TFL source device and the first device, the locations can also be determined to be the same. In an aspect, it can be similar to two people sitting on a bus and the first person asks the second, "Where are we?" The second person replies, "At $42^{nd}$ and Park Ave." The first person can then accept that they too are at $42^{nd}$ and Park Ave.

At 850, a level of error can be associated with the location based on the determined proximity between the first device and the TFL source device. At this point, method 800 can end. Where the two devices are further apart, the error in location can increase as disclosed hereinabove. As such, even where the first device determines that the location is the same as the location of the TFL sharing device, an error can be determined and compensated for. Continuing the above example, even though the first person accepts that they too are on $42^{nd}$ and Park Ave., where they are at the front of the bus and the second person is at the back of the bus, an error of the length of the bus can be presumed. Thus, the first person is the length of the bus ahead of the second person. This is a trivial error when the granularity of the locations is on the order of city blocks and therefor no correction may be made in any computations made by the first person. In a different example, the level of error can be more critical and can be compensated for.

Method 800 can allow devices to receive and employ shared TFL information. In an aspect, this can allow the location of a TFL enabled device to be employed by non-TFL enabled devices for location-centric services. Where location-centric behavior is becoming more commonplace for mobile devices, it can still be difficult to employ on non-mobile devices, such as desktop computers that generally rely on determining location by tracing an internet protocol address. A TFL-enabled cell phone can quickly share TFL information with a desktop computer to allow the desktop to determine that it is located at the same location, with an inherent level of error, as the TFL-enabled cell phone. This determination can allow the desktop computer to perform location-centric functions with location information approaching the accuracy of the sharing TFL-enabled cell phone.

Figure 9:
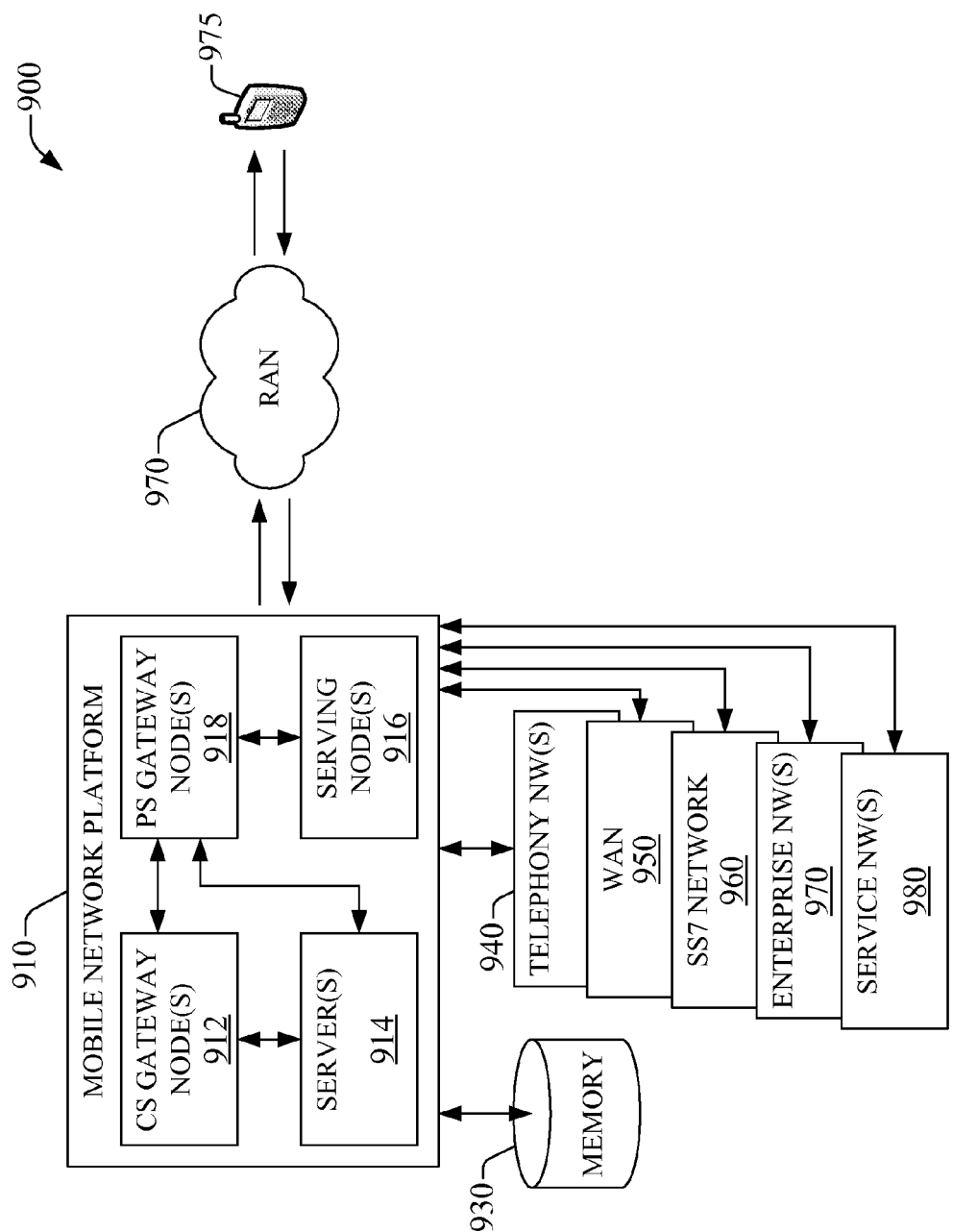
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Further, TFL information can be stored in memory 930. In an aspect, the TFL information can be based on timing signals associated with communication between mobile network platform 910 and mobile device 975 by way of RAN 970. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, can be provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
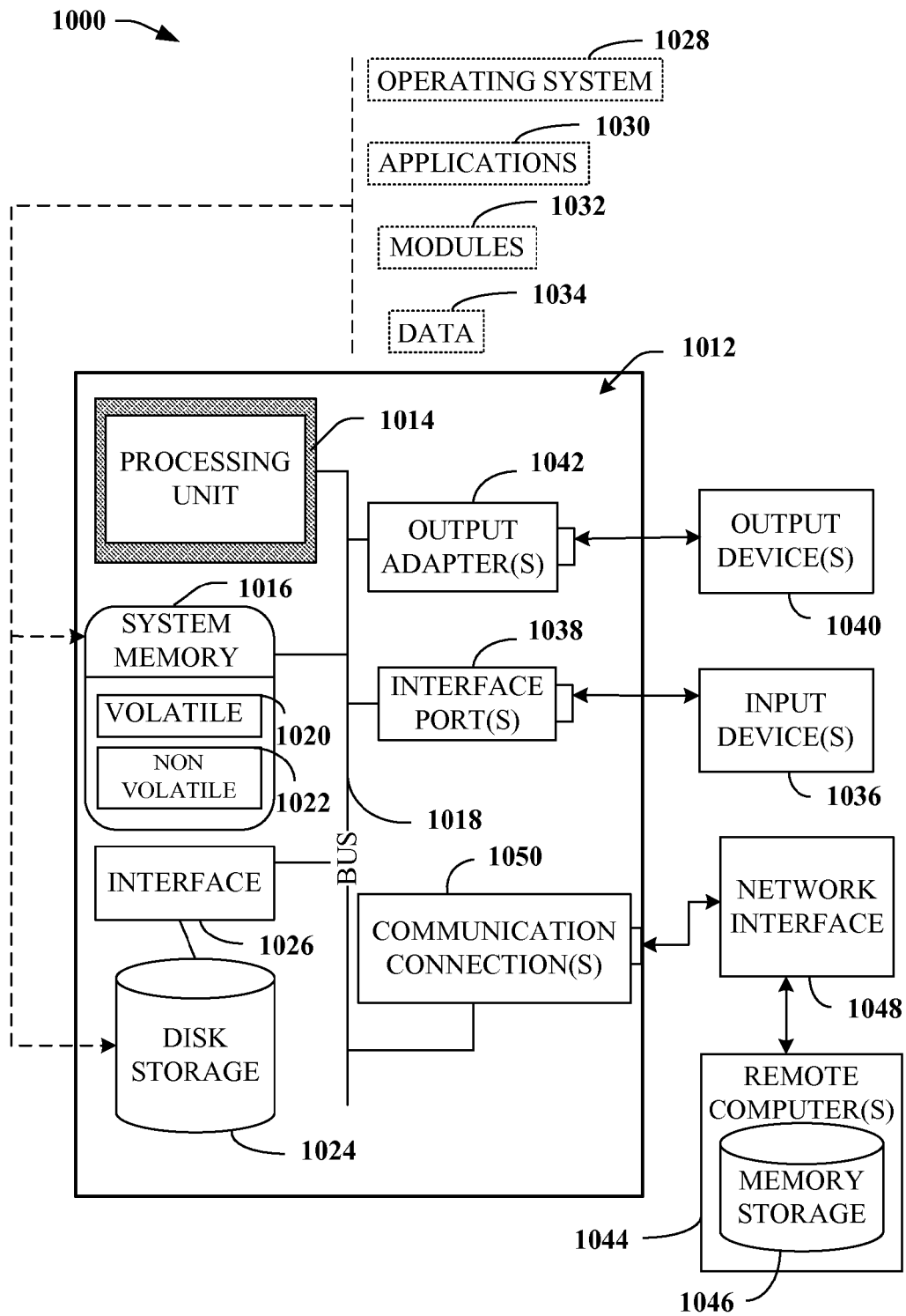
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1020, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012 includes a processing unit 1014, a system memory 1016, and a system bus 1018. In an embodiment, computer 1012 can be part of the hardware of a timed fingerprint location component. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface can be used, such as interface 1026. In an embodiment, disk storage 1024 can store TFL lookup tables to facilitate lookup of location information based on NodeB site pairs and time values. In another embodiment, disk storage 1024 can store TFL location information.

Computing devices can include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and can include many or all of the elements described relative to computer 1012.

For purposes of brevity, only a memory storage device 1046 is illustrated with remote computer(s) 1044. Remote computer(s) 1044 can be logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which can be operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that provide some or all of aggregation, authentication, call control and switching, charging, service invocation, or gateways. Aggregation can refer to the highest level of aggregation in a service provider network wherein the next level in the hierarchy under the core nodes can be the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Zigbee, other 802.XX wireless technologies, Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store executable instructions; and
a processor, coupled to a memory, that facilitates execution of the executable instructions to perform operations, comprising:
receiving timed fingerprint location information associated with a user equipment, wherein the timed fingerprint location information comprises a first differential time value for a NodeB site pair comprising a first NodeB device and a second NodeB device and a second differential time value for another NodeB site pair comprising a third NodeB device, wherein the first and second differential time values are correlated to geographic location information determined before the timed fingerprint location information is received, and wherein the first and second differential time values are stored as part of the timed fingerprint location information to facilitate determining a first location corresponding to the first and second differential time values;
determining an access value based on satisfaction of a condition relating to shared access to the first and second differential time values of the timed fingerprint location information, wherein the access value is associated with sharing the first and second differential time values with another device; and
distributing the first and second differential time values of the timed fingerprint location information to the other device, based on the access value, to facilitate determination of a second location of the other device based on information received from a timed fingerprint location information data store and the first and second differential time values.

2. The system of claim 1, wherein the second differential time value is related to the other NodeB site pair comprising the third NodeB device and a fourth NodeB device.

3. The system of claim 1, wherein the first and second differential time values are distributed to a third device, based on the access value, to facilitate determining the location of the other device.

4. The system of claim 1, wherein the access value is further based on requested information associated with a request to share the timed fingerprint location information.

5. The system of claim 4, wherein the requested information is an identity of a user of a device associated with generating the request.

6. The system of claim 4, wherein the requested information is an identity of a device associated with generating the request.

7. The system of claim 1, further comprising:
receiving historic timed fingerprint location information that comprises a historic differential time value to facilitate a corresponding historic location determination stored on the timed fingerprint location data store based on the historic differential time value.

8. The system of claim 1, wherein an indicator relating to the satisfaction of the condition relating to shared access to the timed fingerprint location information is received from the user equipment.

9. The system of claim 8, wherein the condition is updateable.

10. The system of claim 1, further comprising a short-range radio device that facilitates short-range wireless communications related to sharing the timed fingerprint location information with the other device.

11. A method, comprising:
receiving, by a system comprising a processor, timed fingerprint location information for a user equipment, wherein the timed fingerprint location information comprises a first differential time value for a NodeB site pair comprising a first NodeB device and a second NodeB device and a second differential time value for another NodeB site pair comprising a third NodeB device, wherein the first and second differential time values are correlated to geographic location information determined before the timed fingerprint location information is received by the system, and wherein the first and second differential time values are stored as part of the timed fingerprint location information to facilitate determining a first location corresponding to the first and second differential time values;
receiving, from a device, a request for shared access to the timed fingerprint location information; and
allowing the device to access a portion of the timed fingerprint location information comprising the first and second differential time values to facilitate determining a second location of the device based on the first and second differential time values.

12. The method of claim 11, further comprising:
determining an access value, wherein the shared access is based on the request for access and the access value.

13. The method of claim 12, wherein the determining the access value related to the shared access comprises identifying a user identity of the device associated with generating the request.

14. The method of claim 12, wherein the determining the access value related to the shared access comprises identifying another device associated with generating the request.

15. The method of claim 11, wherein the allowing access to the portion of the timed fingerprint location information comprising the first and second differential time values is based on a privacy policy associated with the system.

16. A mobile device, comprising:
a memory to store executable instructions; and
a processor, coupled to a memory, that facilitates execution of the executable instructions to perform operations, comprising:
receiving timed fingerprint location information comprising a first differential time value for a NodeB site pair comprising a first NodeB device and a second NodeB device and a second differential time value for another NodeB site pair comprising a third NodeB device, wherein the first and second differential time values are correlated to geographic location information determined before the timed fingerprint location information is received, and wherein the first and second differential time values are stored as part of the timed fingerprint location information to facilitate determining a first location corresponding to the first and second differential time values;

determining a permission related to sharing the timed fingerprint location information comprising the first and second differential time values with a user equipment; and sharing the timed fingerprint location information comprising the first and second differential time values with the user equipment based on the permission, facilitating determination of a second location for the user equipment based on the first and second differential time values and location lookup information stored on a data store.

17. The mobile device of claim 16, wherein the permission is further based on receiving, by the mobile device, an identity of a user associated with the user equipment.

18. The mobile device of claim 16, wherein the permission is further based on receiving, by the mobile device, an identity of the user equipment.

19. The mobile device of claim 16, wherein the permission is further based on receiving, by the mobile device, a privacy value stored at the mobile device.

20. The mobile device of claim 16, wherein the permission is further based on receiving, by the mobile device, a privacy value not stored at the mobile device.

21. The mobile device of claim 16, wherein the receiving timed fingerprint location information comprising the first and second differential time values comprises receiving timed fingerprint location information comprising a historical differential time value.

\* \* \* \* \*